L. G. BINKLEY.
MINE CAR WHEEL.
APPLICATION FILED JAN. 22, 1919.
1,329,498.
Patented Feb. 3, 1920.
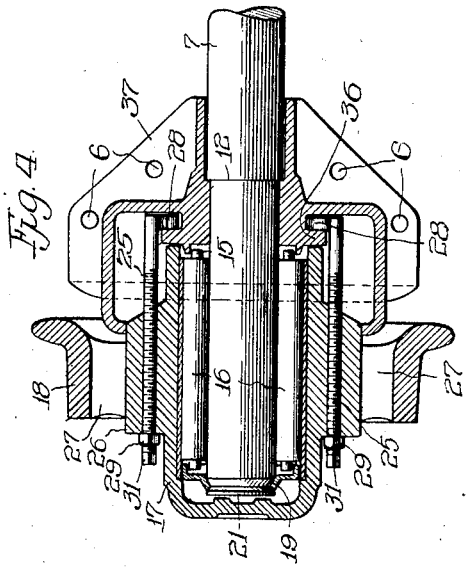
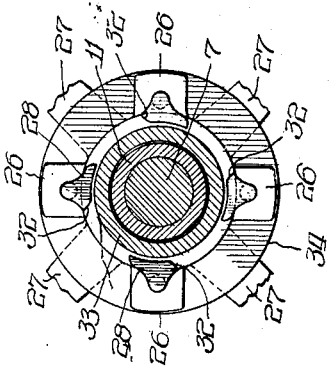
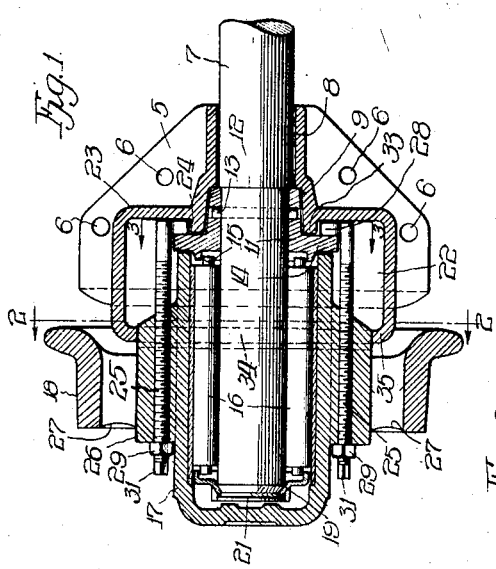
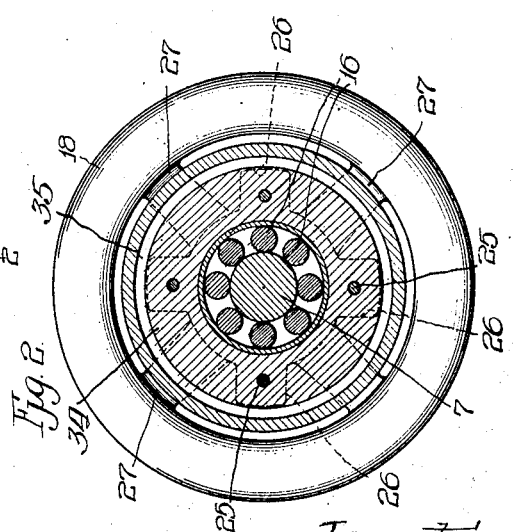
Witness
R. C. Burkhardt.
Inventor:
Leroy G. Binkley
By Fondel Wilson attys

UNITED STATES PATENT OFFICE.

LEROY G. BINKLEY, OF CHICAGO, ILLINOIS, ASSIGNOR TO RAILWAY & MINE SUPPLY COMPANY, OF CHICAGO, ILLINOIS, A CORPORATION OF ILLINOIS.

MINE-CAR WHEEL.

1,329,498.	Specification of Letters Patent.	Patented Feb. 3, 1920.

Application filed January 22, 1919. Serial No. 272,446.

*To all whom it may concern:*

Be it known that I, LEROY G. BINKLEY, a citizen of the United States, residing at Chicago, in the county of Cook and State of Illinois, have invented certain new and useful Improvements in Mine-Car Wheels, of which the following is a specification.

This invention pertains to car wheels and more particularly to wheels of the type used on mine cars which are subjected to extremely rough usage.

In this type of car it is desirable that the wheels be free to rotate independently upon the axle and that the axle also be free to rotate in its bearing boxes. Furthermore, it is essential that each wheel be locked either to the axle or to its bearing box against longitudinal displacement from the axle so that in case of accident the wheel will not come off. It is also highly desirable that the wheels be capable of ready removal from the axle whenever such removal may be required for purposes of inspection, repair or replacement of parts.

One of the primary objects of my invention is to provide a wheel for the purpose mentioned which can be quickly and easily locked in running position and released for removal whenever occasion requires.

For the purpose of facilitating an understanding of my invention, I have disclosed on the accompanying drawings, one preferred embodiment thereof from an inspection of which, when considered in connection with the following description, my invention and many of its inherent advantages should be readily understood and appreciated.

Referring to the drawings,—

Figure 1 is a longitudinal sectional view through a wheel structure embodying my invention;

Figs. 2 and 3 are transverse sectional views taken on the lines 2—2 and 3—3 respectively; and Fig. 4 is a view similar to Fig. 1, showing another embodiment of my invention.

By reference to the drawings it will be observed that reference character 5 indicates generally a bearing box for a mine car adapted to be securely attached to the body of the car by bolts which pass upwardly through the openings 6 provided in the web of the box for that purpose. The axle 7 projecting through the box, as shown, extends from side to side of the car and projects at its opposite side through a box similar to that shown. It is believed, however, that an illustration of the box and axle structure at one side of the car only will be sufficient for an understanding of my invention.

Referring particularly to Figs. 1 to 3 inclusive, the core or bearing portion 8 of the box through which the axle 7 projects is slightly enlarged toward the center of the box, as indicated by reference character 9, to receive a collar 11 which may be rotatably mounted on the axle and held against longitudinal movement or it may be rigidly attached to a reduced portion 12 of the axle by means of a pin 13, as shown, or other preferred fastening means may be employed. This collar is provided at its inner end with a radially projecting flange 14 forming in effect a shoulder on the axle and this flange projects outwardly into the body of the bearing box and is provided on its inner face with an annular rib 15 which serves to hold against displacement the inner ends of the bearing rollers 16 which are interposed between the axle and the surrounding hub 17 of the car wheel 18. The outer ends of the bearing rollers are retained in position by an annular ring 19 preferably formed of sheet metal and provided with lugs which may be struck radially inwardly to engage in a circumferential groove 21 formed in the end of the axle 7 to hold the ring in position. The rollers, therefore, are held in position on the axle by the ring 19 and the rib 15 so that upon removal of the wheel the rollers remain on the axle in position to be inspected or repaired if necessary.

The bearing box has an enlarged core forming an annular chamber 22, as shown, adapted to receive the inner end of the wheel hub so that the wheel and the box are disposed in telescopic relation. The inner wall 23 of the box is spaced inwardly from the axle flange 11 to provide an annular race-way 24, as shown, and this raceway serves to accommodate the locking members which engage behind the flange 14 and lock the wheel rotatably against longitudinal displacement from the axle.

The means for effecting the locking of the wheel against longitudinal displacement comprises a plurality of bolts 25 which are threaded into tapped openings formed in radially projecting lugs or shoulders 26 cast integrally with the wheel structure and disposed between the wheel spokes 27. The inner ends of these bolts project into the bearing box beyond the flange 14 and are provided with radially projecting heads 28 which are adapted to be engaged behind the flange or shoulder 14, as shown in Figs. 1 and 3, to thereby hold the wheel against longitudinal displacement. These bolts, to insure their engagement behind the flange 14, are locked against rotative movement by lock-nuts 29 threaded onto their outer ends where they are readily accessible so that they can be loosened with a wrench when desired.

When removal of the wheel is required for any reason the lock-nuts 29 are backed off a short distance, whereupon, by the application of a wrench to the squared outer ends 31 of the bolts, these bolts may be given a half revolution to free their heads from behind the flange. It will be observed from Fig. 3 that one end of each bolt head 28 is rounded off on an arc concentric with the axis of its bolt, the radius of the arc being of such length that this rounded end will clear the inwardly projecting shoulder 33 of the box so that the bolts are free to be rotated through an arc of 180° into inoperative or disengaged position with respect to the flange. The wheel may thereupon be removed longitudinally of the axle and when it is replaced it can be quickly locked in position again by a half turn of the locking bolts and a tightening up of the lock-nuts 29.

To exclude the entrance of dirt into the bearing box the space between the lugs 26 is closed by an annular rib or web of metal 34 cast between these lugs, and the perimeter of this rib rotatably fits within the inturned outer edge 35 of the box, thereby closing the outer end of the chamber 22 so as to preclude the entrance of dirt into this chamber.

The modification illustrated in Fig. 4 is substantially identical, so far as the wheel structure and locking bolts is concerned, with that just described, but in this instance instead of providing a sleeve 11 which is fixed to the axle and carries the locking flange 14, this flange, indicated in Fig. 4 by reference character 36, is formed integrally with the box 37 so that in this instance the wheel is locked to the bearing box instead of to the axle. The method of assembly of the wheel and the disengagement of the locking means for purposes of removal of the wheel are substantially the same as has been explained.

It should be apparent from the foregoing that I have provided a wheel structure which embodies strength and durability and at the same time employs simple means for locking the wheel in position, and while I have shown and described for purposes of illustration those embodiments of my invention which at present seem preferable and most practical, it should be understood that the structure may be varied considerably without departing from the scope of the invention as defined in the following claims.

I claim:

1. In a mine car wheel, the combination of a box, an axle projecting therethrough, a wheel journaled on said axle with its hub extending into said box, a flange extending radially outwardly within the box, and means carried by said wheel for detachably engaging said flange to lock said wheel against longitudinal displacement, said means being disengageable from said flange without disconnection from said wheel.

2. In a mine car wheel, the combination of a box, an axle projecting therethrough, a wheel journaled on said axle with its hub extending into said box, a flange disposed within the box, and means permanently but removably mounted on said wheel for detachably locking said wheel to said flange, said means being movable on said wheel into operative and inoperative relations with respect to said flange.

3. In a mine car wheel, the combination of a box, an axle, a wheel journaled on said axle, a flange disposed within the box, means permanently mounted on said wheel for detachably locking said wheel to said flange, said means being movable on said wheel from operative to inoperative relation with respect to said flange, and means for locking the aforesaid means against movement relatively to said wheel.

4. In a mine car wheel, the combination of a box, an axle, a wheel journaled on said axle with its hub projecting into said box, a shoulder disposed in said box, and means mounted on said wheel and extending axially thereof and provided with a radial projection for detachably locking said wheel to said shoulder to prevent longitudinal displacement of the wheel.

5. In a mine car wheel, the combination of a box, an axle, a wheel journaled on said axle in telescopic relation with said box, a shoulder disposed within the box, and bolts extending axially of said wheel, having heads adapted to be detachably engaged with said shoulder to prevent longitudinal displacement of said wheel.

6. In a mine car wheel, the combination of a box, an axle, a wheel journaled thereon in telescopic relation to said box, a shoulder disposed within the box, locking members carried by said wheel, shaped to detachably engage said shoulder, and means for locking said members in engaging position, said members being movable on said wheel into disengaged relation with said shoulder to permit longitudinal movement of the wheel.

7. In a mine car wheel, the combination of a box, a wheel disposed in telescopic relation to said box, an annular shoulder within the box, a plurality of bolts permanently carried by said wheel parallel to the axis thereof, said bolts being provided with laterally projecting heads adapted to engage behind said annular shoulder to hold said wheel against longitudinal displacement, said heads being adapted to be disengaged from said shoulder by partial rotation of said bolts so as to permit removal of the wheel, and means for locking said bolts against rotation relatively to the axle.

8. In a mine car wheel, the combination of a box having an open ended chamber, an axle, a wheel having its hub extending into said box chamber, lugs on said wheel, a shoulder in said chamber, bolts carried by said lugs and detachably engaging said shoulder, and an annular rib between said lugs adapted to close the outer end of said chamber.

9. In a mine car wheel, the combination of a box, an axle, a wheel journaled thereon with its hub projecting into said box, an annular shoulder disposed within the box in proximity to but longitudinally beyond the inner end of the wheel hub, and means carried by said wheel and detachably engageable with said shoulder to lock the wheel against longitudinal displacement from the axle, said means being movable relatively to the wheel into inoperative position with respect to said shoulder to permit removal of the wheel.

10. In a mine car wheel, the combination of a box, providing an open ended chamber, an annular shoulder projecting radially outwardly into said chamber, a wheel journaled on said axle, and means carried by said wheel for engaging said shoulder to lock the wheel against longitudinal displacement, said means being movable from the outer side of the wheel into locking or unlocking position with respect to said shoulder.

11. In a mine car wheel, the combination of a box shaped to provide an open ended chamber having an annular shoulder projecting radially outwardly into said chamber, an axle, a wheel journaled on said axle, and locking members movably mounted on said wheel and operable from the outer side of the wheel whereby said wheel may be locked to or unlocked from said box.

12. In a mine car wheel, the combination of a box formed to provide an open ended chamber and a radial flange disposed within the chamber, a wheel having a hub projecting into said chamber, and means carried by the wheel and projecting into the chamber parallel with the hub for locking said wheel to said box, said means being movable on the wheel into unlocked position to permit removal of the wheel.

13. In a mine car wheel, the combination of a box having a longitudinally extending annular shoulder formed thereon to provide a raceway for one end of a set of roller bearings, an axle projecting through said box, a wheel journaled on said axle, bearing rollers interposed between said axle and wheel with their inner ends engaged in said raceway, and a member secured to the outer end of said axle and overlying the outer ends of said rollers so that said rollers are retained in position upon the axle by said shoulder and member when the wheel is removed.

14. In a mine car wheel, the combination of a bearing box, an axle projecting therethrough, a wheel journaled on said axle, bearing rollers interposed between the axle and said wheel, and means comprising a flange carried by the axle and a flange carried by said box, forming raceways for said rollers, whereby said rollers are retained in position on the axle upon removal of the wheel.

15. The combination of a bearing box, an axle projecting therethrough, a wheel journaled on said axle, bearing rollers interposed between the axle and said wheel, and opposed flanges carried by said box and axle, respectively, encircling the ends respectively of said rollers, whereby said rollers are retained in position upon the axle upon removal of the wheel.

16. The combination of a bearing box, an axle projecting therethrough, a wheel journaled on said axle with its hub projecting into said box, a shoulder disposed within said box, and bolts connected with the wheel and extending into said box parallel with said axle, said bolts having heads engaged with said shoulder to lock said wheel to the shoulder.

17. The combination of a bearing box, an axle, a wheel journaled thereon with its hub projecting into said box, bolts carried by the wheel and extending into said box parallel with and outside of the wheel hub, and a shoulder disposed adjacent the inner end of said hub, said bolts being constructed for engagement with said shoulder to lock the wheel against displacement from said shoulder.

18. The combination of a bearing box, an axle, a wheel journaled thereon, a shoulder disposed within said box, and means for rotatably locking said wheel to said shoulder, said means comprising a plurality of members extending from said wheel into said box and engaged with said shoulder.

LEROY G. BINKLEY.